April 25, 1939.  A. B. ARNOLD ET AL  2,156,047
DRIVING CONNECTION
Filed March 31, 1937
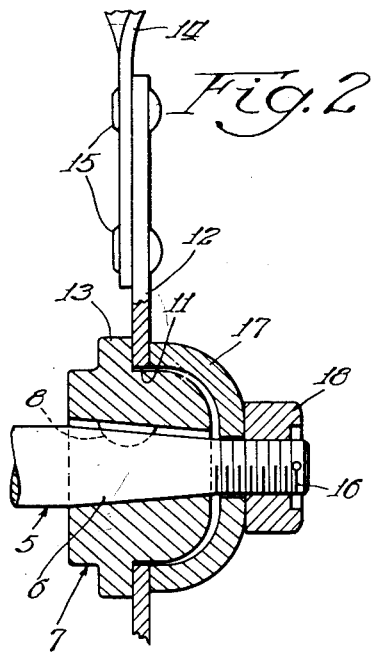
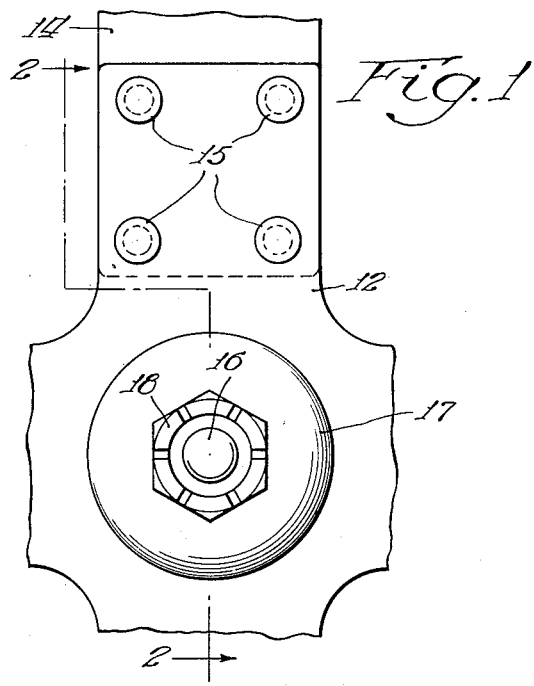
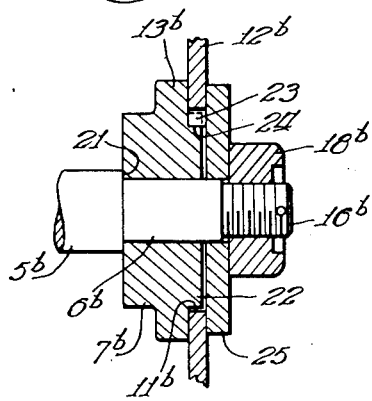
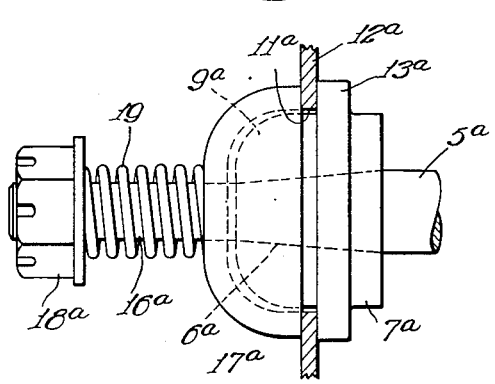
Inventors:
Arthur B. Arnold and
Benjamin Spieth
By: Hill & Hill
Attys.
Witness:
V. Siljander Patented Apr. 25, 1939

2,156,047

UNITED STATES PATENT OFFICE 2,156,047

DRIVING CONNECTION

Arthur B. Arnold and Benjamin Spieth, Racine, Wis., assignors to Modine Manufacturing Company, Racine, Wis., a corporation of Wisconsin Application March 31, 1937, Serial No. 134,085

5 Claims. (Cl. 64—30)

This invention relates to a driving device, and particularly to a frictional driving connection between operatively related driving and driven elements.

One object of the present invention is to provide a novel combination of parts embodied in the structure under consideration whereby the driving and driven elements are retained in proper alignment and relationship with respect to each other.

Another object of the invention is to provide a novel construction and arrangement whereby the condition resulting from sudden changes in speed of the driving element and the inertia of the driven element is compensated for by the connection employed between the respective elements.

Another object of the invention is to provide a novel arrangement for protecting the structure against damage due to sudden changes in speed and the inertia of operatively related parts of the device.

Another object of the invention is to provide a structure wherein a minimum number of parts are employed, thereby requiring only a minimum amount of labor to assemble and disassemble the device, and wherein no special tools are required.

A further object of the invention is to provide a device, which is simple in its construction, efficient in its operation and, owing to the simplicity of construction and the minimum number of parts employed, is economical to manufacture.

A still further object of the invention is to improve devices of the character described in sundry details hereinafter referred to and particularly pointed out in the appended claims.

Several embodiments of the invention are shown for illustrative purposes in the accompanying drawing, in which:

Fig. 1 is a fragmentary front elevational view of a structure embodying features of the present invention;

Fig. 2 is a sectional elevational view of the structure illustrated in Fig. 1, and taken substantially as indicated by the line 2—2 thereof;

Fig. 3 is a side elevational view of a slightly modified structure embodying features of the present invention; and Fig. 4 is a sectional elevational view of a further modified structure, of which the present invention is susceptible.

Although it will be understood that the present invention is applicable, and may be employed for various purposes in connection with various mechanisms, it may be mentioned that its use in a fan driving device has been found to be very desirable and to operate satisfactorily for preserving the fan structure in operative condition.

For illustrative purposes, the present invention will be described in connection with such an arrangement, and referring particularly to Figs. 1 and 2 of the drawing, it will be noted that the structure illustrated therein comprises a driving element shown, in the present instance, as a rotatable shaft indicated, as a whole, by the numeral 5 and having a tapered portion 6 adjacent one end thereof adapted to receive a hub member indicated, as a whole, by the numeral 7 and shown, in the present instance, as secured against rotation on the shaft by means of a key 8.

The hub 7 in the illustrative embodiment is provided with a body portion 9 adapted to be positioned in an aperture 11 formed in a fan spider 12 in a manner to position one side of the spider against a flange or shoulder 13 formed on the hub member 7, the spider 12 having a plurality of fan blades, one being indicated at 14, secured thereto by means of rivets 15.

Mounted on a reduced or threaded portion 16 of the shaft 5, preferably, in a manner to be freely movable longitudinally thereof, is a retaining member 17 shown, in the present instance, as of substantially cup-like form and having its edge portion in engagement with the side of the spider 12 opposite the flange 13, and mounted also on the portion 16 of the shaft 5 in screw-threaded relation thereto is a nut 18 operable through the retaining member 17 to force the spider 12 snugly into frictional engagement with the flange 13 of the hub member 7.

It has been found that owing to the inertia of the fan comprising the spider 12 and blades 14, sudden changes in speed of a driving element connected thereto as, for example, the shaft 5 shown in the drawing, considerable strain is placed upon certain portions of the fan, particularly the rivets 15 to the extent, and with the result, that the rivet connections become loose, noisy and interfere seriously with the efficiency and quiet operation of the fan. This condition, it will be observed, is completely overcome by the structure above described due to the frictional driving connection between the fan and actuating shaft 5 by reason of the fact that sudden changes in speed of the shaft and the inertia of the fan will cause a slippage to take place at the frictional connection, and thereafter allow the rotation of the hub 7 to overcome the inertia during which time the fan will pick up speed and eventually continue rotation with the actuating or driving element, thereby overcoming the effect of sudden shocks to the rivets 15.

It will be observed also that a sudden slowing down of the shaft 5 will, through the structure disclosed, have a like result in gradually slowing down the movement of the fan 14.

The structure illustrated in Fig. 3 is substantially like that described with reference to Figs. 1 and 2, except that the threaded end portion of reduced diameter 16a is elongated, as shown in Fig. 3, to provide space for the positioning thereon of a resilient member shown, in the present instance, as a helical compression spring 19 between a cup-like retaining member 17a and a nut 18a. By such an arrangement, it will be observed that the frictional engagement, between the flange 13a of the hub 7a and the fan spider 12a is of a yielding character and that the degree of pressure at the connection may be varied through tensioning of the spring 19 by the nut 18a.

The construction illustrated in Fig. 3 may be found desirable where the driving force required for rotating the spider 12a of the fan structure is not so great as in a case where the structure illustrated in Figs. 1 and 2 is required.

In Fig. 4, a further modified structure is disclosed wherein the shaft 5b is provided with a portion 6b of reduced diameter forming a shoulder 21 against which the hub member 7b mounted on the reduced portion 6b is positioned. The said hub member 7b, in the present instance, is provided with a boss 22 adapted to receive a spider 12b having an inwardly extending lug or key 23 formed thereon adapted to engage a recess 24 formed in the boss 22 and in a manner to secure the spider 12b against rotation on the boss.

For retaining the spider 12b and hub member 7b in proper operative relation, a retaining member shown, in the present instance, as an apertured plate or disc 25 is slidably mounted on the reduced portion 6b of the shaft and secured thereon by a nut 18b screw-threaded to a further reduced portion 16b of the shaft 5b.

By such an arrangement, it will be observed that the rotation of the nut 18b against the retaining member 25 will force the hub member 7b against the shoulder 21 formed on the shaft in a manner to provide a frictional driving connection between the shaft 5b and the fan spider 12b in a manner to permit relative movement under extreme conditions due to sudden changes in the speed of the shaft and the inertia of the spider and fan mounted thereon as in the case of conditions referred to in connection with the description of the structure illustrated in Figs. 1 and 2.

It will be observed from the foregoing description that the present invention provides a simple and efficient construction and arrangement whereby the conditions resulting from sudden changes in speed of the driving element and the inertia of the driven element is compensated for in a manner to avoid destructive action on the driven element. Also that the present invention, by reason of the minimum number of parts employed, provides a simple, efficient construction, economical to manufacture and which may be assembled or disassembled by a minimum amount of labor employed.

Obviously, the present invention is not limited to the precise construction and arrangement herein shown and described, as the same may be variously modified without departing from the spirit and scope of the invention as set forth in the appended claims.

What we claim as new and desire to secure by Letters Patent is:

1. In a device of the class described and in combination, a rotatable shaft, a hub secured thereto, a fan spider mounted on said hub and relatively movable with respect thereto, a cup-like retaining member surrounding a portion of the hub mounted on said shaft and engageable with said spider, and a nut on said shaft directly engaging the retaining member for urging said member against said spider to provide a frictional driving connection between the retaining member and spider.

2. In a device of the class described and in combination, a rotatable shaft, a hub mounted thereon, a fan spider mounted on said hub and relatively movable with respect thereto, a cup-like retaining member surrounding a portion of the hub and engaging said spider, and means on said shaft directly engaging the retaining member for positively urging said member against said spider to provide a frictional driving connection between the spider and said hub.

3. In a device of the class described and in combination, a rotatable shaft, a hub mounted thereon and rotatable therewith, said hub having an annular flange thereon, a fan spider mounted on said hub adjacent said flange and relatively movable with respect thereto, a cup-like retaining member surrounding a portion of the hub and engaging said spider, and a nut on said shaft directly engaging the retaining member for positively urging said member against said spider and the spider against said flange to provide a frictional driving connection between the spider and said hub.

4. In a device of the class described and in combination, a rotatable shaft, a hub having an annular flange thereon and mounted on said shaft, a fan spider mounted on said hub and relatively movable with respect thereto, a cup-like retaining member having an aperture therein adapted to receive said shaft and having a portion surrounding a portion of said hub, the edge portion of said cup-like member engaging said spider, and a nut on said shaft directly engaging the cup-like retaining member for urging said member against the spider and the spider against said flange to provide a frictional driving connection between the spider and said hub.

5. In a device of the class described and in combination, a rotatable shaft, a hub having a flange mounted thereon secured to said shaft, a fan spider mounted on said hub adjacent said flange and relatively movable with respect thereto, a cup-like retaining member having an aperture therein adapted to receive said shaft and having a portion surrounding a portion of said hub, the edge portion of said cup-like member engaging said spider, and a nut on said shaft directly engaging the cup-like retaining member for urging said member against the spider and the spider against said flange to provide a frictional driving connection between the spider and said hub.

ARTHUR B. ARNOLD.
BENJAMIN SPIETH.